F. J. KOPEL.
DIRIGIBLE LAMP.
APPLICATION FILED AUG. 28, 1911.
1,009,530.  
Patented Nov. 21, 1911.
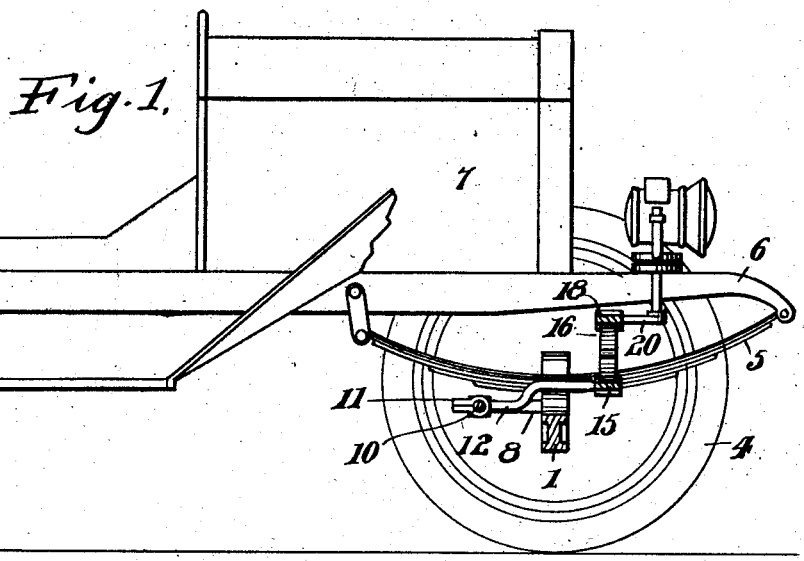
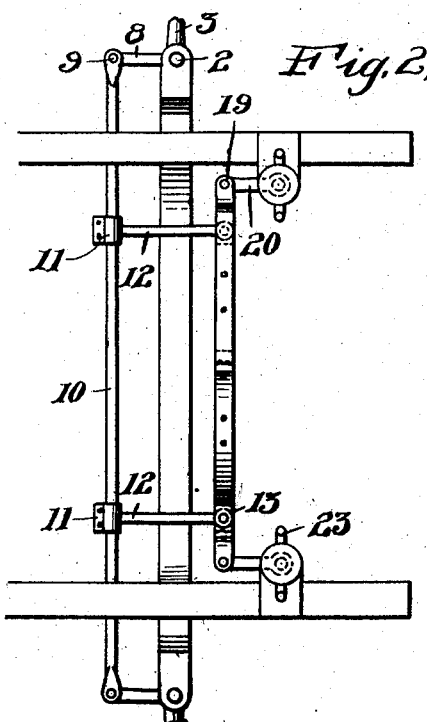
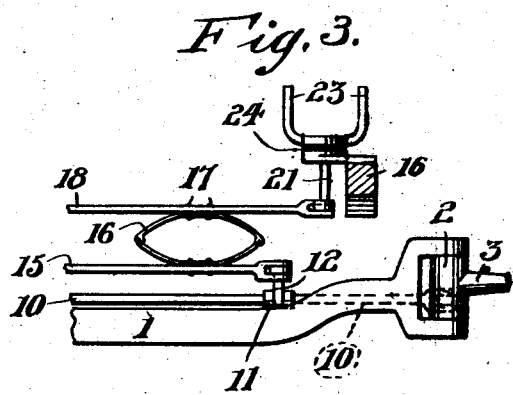
WITNESSES:  
Samuel Payne  
Ralph C. Evett
INVENTOR.  
F. J. Kopel  
BY  
ATTORNEYS.

UNITED STATES PATENT OFFICE.

FRANK J. KOPEL, OF BUXTON, IOWA.

DIRIGIBLE LAMP.

1,009,530.  Specification of Letters Patent.  Patented Nov. 21, 1911.

Application filed August 28, 1911. Serial No. 646,380.

*To all whom it may concern:*

Be it known that I, FRANK J. KOPEL, citizen of the United States of America, residing at Buxton, in the county of Monroe and State of Iowa, have invented certain new and useful Improvements in Dirigible Lamps, of which the following is a specification, reference being had therein to the accompanying drawing.

This invention relates to dirigible lamps for automobiles, and the objects of my invention are to furnish an automobile or similar vehicle with a lamp or lantern shifting mechanism that will be actuated by the steering mechanism of the automobile, whereby the lamps or lanterns will cast rays of light in the direction in which the forward wheels of the automobile are traveling, and to accomplish the above object by a mechanical construction that is simple, durable and applicable to various types of automobiles.

With the above and other objects in view, the invention resides in the novel construction, combination, and arrangement of parts to be hereinafter specifically described and then claimed.

Reference will now be had to the drawing, wherein:

Figure 1 is a longitudinal sectional view of the lamp shifting mechanism as applied to a portion of an automobile; and Fig. 2 is a top plan and Fig. 3 is a front elevation broken away.

The reference numeral 1 denotes the forward axle of an automobile having knuckles 2 and spindles 3 revolubly supporting the forward wheels 4 of the automobile. The axle 1 supports springs 5 and these springs support the forward ends of the longitudinal frame 6 of the automobile, designated 7. The knuckles 2 are provided with rearwardly extending cranks 8, having the ends thereof pivotally connected by pins 9 to the ends of an actuating rod 10. Mounted upon the rod 10 by clamps 11 are forwardly extending arms 12, and the forward ends of these rods are pivotally connected by pins 13 to the bifurcated ends 14 of a connecting rod 15.

Mounted upon the rod 15, adjacent to the pivoted ends thereof, are leaf springs 16 attached, as at 17 to a rigid rod 18. This rod has the ends thereof bifurcated and pivotally connected by pins 19 to cranks 20 carried by the lower ends of vertical shafts 21. The shafts 21 extend through bearings 22 carried by the frame 6, and are provided with lamp or lantern-holders 23. Anti-frictional balls 24 are interposed between the bearings 22 and the base of each lamp holder.

It is obvious that when the knuckles 2 are shifted that the actuating rod 10 is moved to shift the connecting rod 15 and the rigid rod 18, thereby moving the cranks 20 in a direction similar to the cranks 8, consequently the lamps or lanterns will be shifted in a direction similar to the wheels 4.

The springs 16 compensate for the vibrations of the automobile body relatively to the forward axle 1, thereby preventing the lamps or lanterns from being injured as would be the case if the shafts 21 were rigidly connected by the shifting mechanism to the knuckles of the forward axle. The lamp shifting mechanism can be made of light and durable metal and installed without interfering with the steering mechanism of the automobile.

What I claim is:

In a dirigible lamp for automobiles, the combination with a forward axle, knuckles carried by the ends thereof, the longitudinal frames of the automobile and lamp holders carried by said frames, of rearwardly extending cranks carried by said knuckles, an actuating rod having the ends thereof pivotally connected to said cranks, forwardly extending arms having the rear ends thereof clamped upon said actuating rod, a connecting rod having the ends thereof pivotally connected to said arms, leaf springs mounted upon said connecting rod, a rigid rod attached to said springs, and rearwardly extending cranks carried by said lamp holders and pivotally connected to the ends of said rigid rod.

In testimony whereof I affix my signature in the presence of two witnesses.

FRANK J. KOPEL.

Witnesses:
HELVA TROSELIUS,
TEKLA PETERSON.

Copies of this patent may be obtained for five cents each, by addressing the "Commissioner of Patents, Washington, D. C."